United States Patent
Takita et al.

(10) Patent No.: US 9,492,965 B2
(45) Date of Patent: Nov. 15, 2016

(54) METHOD FOR PRODUCING MULTI-LAYER, MICROPOROUS POLYOLEFIN MEMBRANE

(75) Inventors: Kotaro Takita, Nasushiobara (JP); Shintaro Kikuchi, Saitama (JP)

(73) Assignee: TORAY BATTERY SEPARATOR FILM CO., LTD, Tochigi (JP)

( * ) Notice: Subject to any disclaimer, the term of this patent is extended or adjusted under 35 U.S.C. 154(b) by 0 days.

(21) Appl. No.: 12/089,676

(22) PCT Filed: Oct. 19, 2006

(86) PCT No.: PCT/JP2006/320861
§ 371 (c)(1),
(2), (4) Date: Apr. 9, 2008

(87) PCT Pub. No.: WO2007/046473
PCT Pub. Date: Apr. 26, 2007

(65) Prior Publication Data
US 2009/0134538 A1    May 28, 2009

(30) Foreign Application Priority Data

Oct. 19, 2005  (JP) ................................. 2005-305065
Oct. 19, 2005  (JP) ................................. 2005-305066
Oct. 18, 2006  (JP) ................................. 2006-284009

(51) Int. Cl.
| | | |
|---|---|---|
| *B29C 55/02* | (2006.01) | |
| *B29C 47/00* | (2006.01) | |
| *B29C 47/06* | (2006.01) | |
| *B29C 55/00* | (2006.01) | |
| *B29C 55/16* | (2006.01) | |
| *B32B 5/32* | (2006.01) | |
| *B32B 27/32* | (2006.01) | |
| *B32B 38/00* | (2006.01) | |
| *H01M 2/14* | (2006.01) | |
| *H01M 2/16* | (2006.01) | |
| *B29K 23/00* | (2006.01) | |
| *B29K 105/04* | (2006.01) | |
| *B32B 37/15* | (2006.01) | |
| *B32B 38/16* | (2006.01) | |

(52) U.S. Cl.
CPC ......... *B29C 55/023* (2013.01); *B29C 47/0021* (2013.01); *B29C 47/06* (2013.01); *B29C 55/005* (2013.01); *B29C 55/16* (2013.01); *B32B 5/32* (2013.01); *B32B 27/32* (2013.01); *B32B 38/0032* (2013.01); *H01M 2/145* (2013.01); *H01M 2/1653* (2013.01); *H01M 2/1686* (2013.01); *B29K 2023/065* (2013.01); *B29K 2023/0683* (2013.01); *B29K 2023/12* (2013.01); *B29K 2105/04* (2013.01); *B32B 37/153* (2013.01); *B32B 2038/0028* (2013.01); *B32B 2038/168* (2013.01); *B32B 2305/026* (2013.01); *B32B 2323/04* (2013.01); *B32B 2323/10* (2013.01)

(58) Field of Classification Search
CPC ..................................................... B29C 55/023
USPC .......................... 264/173.19, 28; 428/315.7
See application file for complete search history.

(56) References Cited

U.S. PATENT DOCUMENTS

| | | | |
|---|---|---|---|
| 4,620,956 A | 11/1986 | Hamer | |
| 4,828,772 A | 5/1989 | Lopatin et al. | |
| 4,863,792 A | 9/1989 | Mrozinski | |
| 5,240,655 A * | 8/1993 | Troffkin et al. | ................. 264/28 |
| 5,691,047 A * | 11/1997 | Kurauchi et al. | .......... 428/315.7 |
| 5,824,430 A | 10/1998 | Higuchi et al. | |
| 2003/0104273 A1 | 6/2003 | Lee et al. | |
| 2004/0213985 A1 | 10/2004 | Lee et al. | |

FOREIGN PATENT DOCUMENTS

| | | |
|---|---|---|
| CN | 1034375 A | 8/1989 |
| EP | 0365112 A2 | 4/1990 |
| EP | 0682376 A1 | 11/1995 |
| JP | 62-121737 A | 6/1987 |
| JP | 2021559 A | 1/1990 |
| JP | 02-077108 A | 3/1990 |

(Continued)

OTHER PUBLICATIONS

Japanese Patent Office, "Notice of Reason for Rejection," issued in connection with Japanese Patent Application No. 2007-541041, dated Aug. 21, 2012.

(Continued)

*Primary Examiner* — Larry Thrower
(74) *Attorney, Agent, or Firm* — Sughrue Mion, PLLC

(57) ABSTRACT

A multi-layer, microporous polyolefin membrane comprising a polypropylene layer and a polyethylene resin layer and having well-balanced permeability, mechanical strength, heat shrinkage resistance, shutdown properties and meltdown properties can be obtained by (1) forming a sheet comprising a gel-like polypropylene layer containing a membrane-forming solvent or a polypropylene layer containing no membrane-forming solvent and a gel-like polyethylene resin layer containing a membrane-forming solvent, stretching the sheet at two-stage temperatures, and then removing the membrane-forming solvent, or (2) forming a gel-like polypropylene sheet containing a membrane-forming solvent or a polypropylene sheet containing no membrane-forming solvent, and a gel-like polyethylene resin sheet containing a membrane-forming solvent, stretching them at two-stage temperatures, removing the membrane-forming solvent, and then laminating the resultant microporous polypropylene membrane and the resultant microporous polyethylene membrane.

2 Claims, No Drawings

(56) References Cited

FOREIGN PATENT DOCUMENTS

| | | |
|---|---|---|
| JP | 04-181651 A | 6/1992 |
| JP | 05-251069 A | 9/1993 |
| JP | 05-251070 A | 9/1993 |
| JP | 06-329823 A | 11/1994 |
| JP | 07-307146 A | 11/1995 |
| JP | 09-219184 A | 8/1997 |
| JP | 2000-044722 A | 2/2000 |
| JP | 2002256099 A | 9/2002 |
| JP | 2002-367584 A | 12/2002 |
| JP | 2003-535683 A | 12/2003 |
| JP | 2004-519824 A | 7/2004 |

OTHER PUBLICATIONS

Communication dated Nov. 18, 2014 from the European Patent Office in counterpart European Patent Application No. 06812039.3.
State Intellectual Property Office of People's Republic of China, "The Second Office Action," issued in connection with Chinese Patent Application No. 200680038861.2, dated Apr. 25, 2012.
State Intellectual Property Office of People's Republic of China, "The Third Office Action," issued in connection with Chinese Patent Application No. 200680038861.2, dated Nov. 29, 2012.
Taiwanese Patent Office, "Office Action," issued in connection with Taiwanese Patent Application No. 095138542, dated Nov. 8, 2012.

* cited by examiner

METHOD FOR PRODUCING MULTI-LAYER, MICROPOROUS POLYOLEFIN MEMBRANE

This is a 371 of Application No. PCT/JP2006/320861 filed Oct. 19, 2005, claiming the priority of JP2005-305065 filed Oct. 19, 2005, JP2005-305066 filed Oct. 19, 2005 and JP2006-284009 filed Oct. 18, 2006, all of which are hereby incorporated by reference.

FIELD OF THE INVENTION

This invention relates to a method for producing a multi-layer, microporous polyolefin membrane comprising a polypropylene layer and a polyethylene resin layer, thereby having well-balanced permeability, mechanical strength, heat shrinkage resistance, shutdown properties and meltdown properties.

BACKGROUND OF THE INVENTION

Microporous polyolefin membranes are widely used in separators for lithium secondary batteries, nickel-hydrogen batteries, nickel-cadmium batteries and polymer batteries as well as electrolytic capacitor separators, various filters such as reverse osmosis membranes, ultrafiltration membranes and microfiltration membranes, steam-permeable, waterproof clothing, medical materials, etc. When microporous polyolefin membranes are used as battery separators, particularly as lithium ion battery separators, their performance largely affects the performance, productivity and safety of batteries. Accordingly, microporous polyolefin membranes are required to have excellent permeability, mechanical properties, heat shrinkage resistance, shutdown properties, meltdown properties, etc.

In general, microporous membranes made only of polyethylene have low meltdown temperatures, while microporous membranes made only of polypropylene have high shutdown temperatures. Thus, microporous membranes based on polyethylene and polypropylene are suitable for battery separators. Thus proposed are microporous membranes made of a mixture of polyethylene and polypropylene, and multi-layer, microporous membranes comprising a polyethylene layer and a polypropylene layer.

For instance, JP 05-251069 A and JP 05-251070 A disclose a separator free from thermal runaway, which is formed by a multi-layer, microporous sheet comprising a first layer made of an ethylene-butene copolymer or an ethylene-hexene copolymer for causing shutdown at 80 to 150° C., and a second layer made of polypropylene for causing shutdown at a higher temperature by 10° C. or more than in the first layer.

JP 05-251069 A discloses a method for producing a multi-layer, microporous sheet comprising the steps of producing a laminate sheet comprising a layer made of the above copolymer and an extractable solvent and a layer made of polypropylene and an extractable solvent, removing the extractable solvent from the sheet to obtain a microporous sheet, and stretching the microporous sheet at a temperature of 25 to 110° C. JP 05-251070 A discloses a method for producing a multi-layer, microporous sheet comprising the steps of simultaneously extruding a melt of the above copolymer and a polypropylene melt, cooling the melts to obtain a laminate sheet, stretching the laminate sheet at a temperature from −198° C. to −70° C., and heat-treating the laminate sheet.

However, investigation by the inventors have revealed that the methods described in the above references produce multi-layer, microporous membranes comprising a polypropylene layer and a polyethylene layer, which have small pore diameters in the polypropylene layer, thereby having insufficient permeability. Thus desired is a multi-layer, microporous polyolefin membrane comprising a polyethylene layer and a polypropylene layer, thereby having well-balanced permeability, mechanical strength, heat shrinkage resistance, shutdown properties and meltdown properties.

OBJECT OF THE INVENTION

Accordingly, an object of this invention is to provide a method for producing a multi-layer, microporous polyolefin membrane comprising a polypropylene layer and a polyethylene resin layer, thereby having well-balanced permeability, mechanical strength, heat shrinkage resistance, shutdown properties and meltdown properties.

DISCLOSURE OF THE INVENTION

As a result of intense research in view of the above object, the inventors have found that a multi-layer, microporous polyolefin membrane comprising a polypropylene layer and a polyethylene resin layer and having well-balanced permeability, mechanical strength, heat shrinkage resistance, shutdown properties and meltdown properties is obtained by (1) forming a sheet comprising a gel-like polypropylene layer containing a membrane-forming solvent, or a polypropylene layer containing no membrane-forming solvent, and a gel-like polyethylene resin layer containing a membrane-forming solvent, stretching the sheet at two-stage temperatures, and then removing the membrane-forming solvent, or (2) forming a gel-like polypropylene sheet containing a membrane-forming solvent, or a polypropylene sheet containing no membrane-forming solvent, and a gel-like polyethylene resin sheet containing a membrane-forming solvent, stretching them at two-stage temperatures, removing the membrane-forming solvent, and then laminating the resultant microporous polypropylene membrane and the resultant microporous polyethylene membrane. This invention has been completed based on such finding.

Thus, the first method of this invention for producing a multi-layer, microporous polyolefin membrane comprises the steps of simultaneously extruding a melt blend of polypropylene and a membrane-forming solvent, and a melt blend of a polyethylene resin and a membrane-forming solvent through a die, cooling the resultant extrudate to provide a gel-like laminate sheet, stretching the gel-like laminate sheet at a temperature of −20° C. or higher and lower than +90° C., conducting re-stretching at a temperature of 90 to 135° C., and then removing the membrane-forming solvent from the stretched gel-like laminate sheet.

The second method of this invention for producing a multi-layer, microporous polyolefin membrane comprises the steps of extruding a melt blend of polypropylene and a membrane-forming solvent and a melt blend of a polyethylene resin and a membrane-forming solvent through separate dies, cooling the resultant extrudates to provide gel-like sheets, stretching the gel-like sheets at a temperature of −20° C. or higher and lower than +90° C., conducting re-stretching at a temperature of 90 to 135° C., removing the membrane-forming solvent from each of the stretched gel-like sheets, and then laminating the resultant microporous polypropylene membrane and the resultant microporous polyethylene membrane.

The third method of this invention for producing a multi-layer, microporous polyolefin membrane comprises the steps of simultaneously extruding a polypropylene melt and a melt blend of a polyethylene resin and a membrane-forming solvent through a die, cooling the resultant extrudate to provide a laminate sheet, stretching the laminate sheet at a temperature of −20° C. to +70° C., conducting re-stretching at a temperature of 90 to 135° C., and then removing the membrane-forming solvent from the stretched laminate sheet.

The fourth method of this invention for producing a multi-layer, microporous polyolefin membrane comprises the steps of extruding a polypropylene melt and a melt blend of a polyethylene resin and a membrane-forming solvent through separate dies, cooling each of the resultant extrudates to provide a polypropylene sheet and a gel-like polyethylene resin sheet, stretching the polypropylene sheet and the gel-like polyethylene resin sheet at a temperature of −20° C. to +70° C., conducting re-stretching at a temperature of 90 to 135° C. to form a microporous polypropylene membrane and a stretched gel-like polyethylene resin sheet, removing the membrane-forming solvent from the stretched gel-like polyethylene resin sheet to form a microporous polyethylene membrane, and then laminating the microporous polypropylene membrane and the microporous polyethylene membrane.

DESCRIPTION OF THE PREFERRED EMBODIMENTS

[1] Polypropylene

The types of polypropylene are not particularly critical, but the polypropylene can be a homopolymer of propylene, a copolymer of propylene with other olefin(s) and/or diolefin(s) or a mixture thereof, and is preferably a homopolymer. The copolymer can be a random or block copolymer. The other olefins than propylene are preferably ethylene or α-olefins having 4 to 8 carbon atoms. The α-olefins having 4 to 8 carbon atoms include, for instance, butene-1, pentene-1, hexene-1,4-methyl-1-pentene, octene-1, etc. The diolefins preferably have 4 to 14 carbon atoms. The diolefins having 4 to 14 carbon atoms include, for instance, butadiene, 1,5-hexadiene, 1,7-octadiene, 1,9-decadiene, etc.

The content of the other olefin(s) or diolefin(s) than propylene in the copolymer is preferably within a range not deteriorating the properties such as heat resistance, compression resistance, heat shrinkage resistance, etc. of polypropylene. Specifically, the content of the other olefin(s) or diolefin(s) is preferably less than 10% by mole, based on 100% by mole of the entire copolymer.

The mass-average molecular weight (Mw) of polypropylene is preferably $1 \times 10^5$ to $8 \times 10^5$. The molecular weight distribution (Mw/Mn) of polypropylene is preferably 1.01 to 100, more preferably 1.1 to 50.

[2] Polyethylene Resin

The polyethylene resin is (a) ultra-high-molecular-weight polyethylene, (b) polyethylene other than the ultra-high-molecular-weight polyethylene, (c) a mixture of ultra-high-molecular-weight polyethylene with the other polyethylene (polyethylene composition), or (d) a mixture of any one of (a) to (c) with a polyolefin other than polyethylene (polyolefin composition). In any case, though not critical, the mass-average molecular weight (Mw) of the polyethylene resin is preferably $1 \times 10^4$ to $1 \times 10^7$, more preferably $1 \times 10^4$ to $5 \times 10^6$, particularly $1 \times 10^4$ to $4 \times 10^6$.

(a) Ultra-High-Molecular-Weight Polyethylene

The ultra-high-molecular-weight polyethylene has Mw of $5 \times 10^5$ or more. The ultra-high-molecular-weight polyethylene can be not only an ethylene homopolymer, but also an ethylene-α-olefin copolymer containing a small amount of other α-olefin(s). The other α-olefins than ethylene are preferably propylene, butene-1, pentene-1, hexene-1,4-methylpentene-1, octene-1, vinyl acetate, methyl methacrylate, and styrene. The Mw of the ultra-high-molecular-weight polyethylene is preferably $1 \times 10^6$ to $15 \times 10^6$, more preferably $1 \times 10^6$ to $5 \times 10^6$. Not only one type of the ultra-high-molecular-weight polyethylene, but also a mixture of two or more types of the ultra-high-molecular-weight polyethylene can be used. The mixture can be, for instance, a mixture of two or more types of the ultra-high-molecular-weight polyethylene having different Mws.

(b) Other Polyethylene than Ultra-High-Molecular-Weight Polyethylene

The other polyethylene than the ultra-high-molecular-weight polyethylene has Mw of $1 \times 10^4$ or more and less than $5 \times 10^5$, preferably being high-density polyethylene, intermediate-density polyethylene, branched low-density polyethylene or linear low-density polyethylene, more preferably high-density polyethylene. The polyethylene having Mw of $1 \times 10^4$ or more and less than $5 \times 10^5$ can be not only an ethylene homopolymer, but also a copolymer containing a small amount of other α-olefin(s) such as propylene, butene-1, hexene-1, etc. Such copolymers are preferably produced using single-site catalysts. Not only one type of polyethylene other than the ultra-high-molecular-weight polyethylene, but also a mixture of two or more types of the other polyethylene than the ultra-high-molecular-weight polyethylene can be used. The mixture can be, for instance, a mixture of two or more types of the high-density polyethylene having different Mws, a mixture of similar intermediate-density polyethylenes, a mixture of similar low-density polyethylenes, etc.

(c) Polyethylene Composition

The polyethylene composition is a mixture of ultra-high-molecular-weight polyethylene having Mw of $5 \times 10^5$ or more, and the other polyethylene, which is at least one selected from the group consisting of high-density polyethylene, intermediate-density polyethylene, branched low-density polyethylene, and linear low-density polyethylene. The ultra-high-molecular-weight polyethylene and the other polyethylene can be the same as described above. The other polyethylene preferably has Mw of $1 \times 10^4$ or more and less than $5 \times 10^5$. The molecular weight distribution [mass-average molecular weight/number-average molecular weight (Mw/Mn)] of this polyethylene composition can be easily controlled depending on applications. The polyethylene composition is preferably a composition of the above ultra-high-molecular-weight polyethylene and high-density polyethylene. The content of the ultra-high-molecular-weight polyethylene in the polyethylene composition is preferably 1% or more by mass, more preferably 10 to 80% by mass, based on 100% by mass of the entire polyethylene composition.

(d) Polyolefin Composition

The polyolefin composition is a mixture of the ultra-high-molecular-weight polyethylene, the other polyethylene or the polyethylene composition, and a polyolefin other than polyethylene. The ultra-high-molecular-weight polyethylene, the other polyethylene, and the polyethylene composition can be the same as described above.

The polyolefin other than polyethylene can be at least one selected from the group consisting of polypropylene, polybutene-1, polypentene-1, polymethylpentene, polyhexene-1, polyoctene-1, polyvinyl acetate, polymethyl methacrylate, polystyrene and ethylene-α-olefin copolymers each having Mw of $1 \times 10^4$ to $4 \times 10^6$, and a polyethylene wax having Mw of $1\times10^3$ to $1\times10^4$. Polypropylene, polybutene-1, polypentene-1, polymethylpentene, polyhexene-1, polyoctene-1, polyvinyl acetate, polymethyl methacrylate and polystyrene can not only be homopolymers, but also copolymers containing other α-olefin(s). The percentage of the polyolefin other than polyethylene is preferably 20% or less by mass, more preferably 10% or less by mass, based on 100% by mass of the entire polyolefin composition.

(e) Molecular Weight Distribution Mw/Mn

Mw/Mn is a measure of a molecular weight distribution, the larger this value, the wider the molecular weight distribution. Though not critical, the Mw/Mn of the polyethylene resin is preferably 5 to 300, more preferably 10 to 100, when the polyethylene resin is the ultra-high-molecular-weight polyethylene, the other polyethylene or the polyethylene composition. When the Mw/Mn is less than 5, there are excessive high-molecular weight components, resulting in difficulty in melt extrusion. When the Mw/Mn is more than 300, there are excessive low-molecular weight components, resulting in a microporous membrane with decreased strength. The Mw/Mn of the polyethylene (homopolymer or ethylene-α-olefin copolymer) can be properly controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition, the larger the Mw/Mn, the larger difference in Mw between the ultra-high-molecular-weight polyethylene and the other polyethylene, and vice versa. The Mw/Mn of the polyethylene composition can be properly controlled by the molecular weight and mixing ratio of the components.

[3] Production Method of Multi-Layer, Microporous Polyolefin Membrane (a) First Production Method The first method of this invention for producing the multi-layer, microporous polyolefin membrane comprises the steps of (1) (i) melt-blending the above polypropylene and a membrane-forming solvent to prepare a polypropylene solution, (ii) melt-blending the above polyethylene resin and a membrane-forming solvent to prepare a polyethylene solution, (2) simultaneously extruding the polypropylene solution and the polyethylene solution through a die, (3) cooling the resultant extrudate to provide a gel-like laminate sheet, (4) subjecting the gel-like laminate sheet to two-stage stretching at different temperatures, (5) removing the membrane-forming solvent, and (6) drying the resultant membrane. If necessary, a hot solvent treatment step (7) can be conducted between the steps (4) and (5), and a step (8) of stretching the multi-layer, microporous membrane, a heat treatment step (9), a cross-linking step (10) with ionizing radiations, a hydrophilizing step (11), a surface-coating step (12), etc. can be conducted after the step (6).

(1) Preparation of Polyolefin Solution (i) Preparation of Polypropylene Solution Polypropylene is melt-blended with an appropriate membrane-forming solvent to prepare a polypropylene solution. The polypropylene solution can contain various additives such as antioxidants, ultraviolet absorbers, anti-blocking agents, pigments, dyes, inorganic fillers, etc. within ranges not deteriorating the effects of this invention, if necessary. For instance, fine silica powder can be added as a pore-forming agent.

The membrane-forming solvent is preferably liquid at room temperature. The use of a liquid solvent enables stretching at a relatively high magnification. The liquid solvents can be linear or cyclic aliphatic hydrocarbons such as nonane, decane, decalin, p-xylene, undecane, dodecane, liquid paraffin, etc.; mineral oil distillates having boiling points corresponding to those of the above hydrocarbons; and phthalates liquid at room temperature, such as dibutyl phthalate, dioctyl phthalate, etc. To obtain a gel-like sheet having a stable liquid solvent content, it is preferable to use non-volatile liquid solvents such as liquid paraffin. Also, a solvent miscible with polypropylene in melt blending but solid at room temperature can be added to the liquid solvent. Such solid solvents are stearyl alcohol, ceryl alcohol, paraffin wax, etc. However, the use of only a solid solvent results in the likelihood of uneven stretching, etc.

The viscosity of the liquid solvent is preferably 30 to 500 cSt, more preferably 30 to 200 cSt, at 25° C. When the viscosity at 25° C. is less than 30 cSt, foaming easily occurs, resulting in difficulty in blending. The viscosity of more than 500 cSt makes the removal of the liquid solvent difficult.

Though not particularly critical, the uniform melt blending of the polypropylene solution is preferably conducted in a double-screw extruder. Melt blending in a double-screw extruder is suitable for providing a high-concentration polypropylene solution. The melt-blending temperature is preferably in a range from $Tm_1$ to $Tm_1+90°$ C., wherein $Tm_1$ is the melting point of polypropylene. Because the melting point of polypropylene is usually 155 to 175° C., the melt-blending temperature is preferably 160 to 250° C., more preferably 170 to 240° C. The melting point is measured by differential scanning calorimetry (DSC) according to JIS K7121. The membrane-forming solvent can be added before starting the melt blending, or charged into the double-screw extruder at an intermediate position during the melt blending, though the latter is preferable. In the melt blending, an antioxidant is preferably added to prevent the oxidization of polypropylene.

A ratio L/D, in which L and D respectively represent the length and diameter of a screw in the double-screw extruder, is preferably 20 to 100, more preferably 35 to 70. When L/D is less than 20, enough melt blending is not achieved. When L/D is more than 100, there is too much residence time for the polypropylene solution. A cylinder of the double-screw extruder preferably has an inner diameter of 40 to 80 mm.

The polypropylene content is preferably 10 to 60% by mass, more preferably 20 to 55% by mass, based on 100% by mass of the polypropylene solution. Less than 10% by mass of the polypropylene content causes large swelling and neck-in at the die exit in the extrusion, resulting in decrease in the formability and self-supportability of the extrudate. More than 60% by mass of the polypropylene content deteriorates the formability of the extrudate.

(ii) Preparation of Polyethylene Solution

The polyethylene solution is prepared by adding the membrane-forming solvent to the polyethylene resin and melt-blending them. The polyethylene solution can be prepared in the same manner as the polypropylene solution, except that the melt-blending temperature is preferably $Tm_2+10°$ C. to $Tm_2+100°$ C., wherein $Tm_2$ is the melting point of the polyethylene resin.

The melting point $Tm_2$ of the polyethylene resin corresponds to that of (a) the ultra-high-molecular-weight polyethylene, (b) the other polyethylene than the ultra-high-molecular-weight polyethylene or (c) the polyethylene composition when the polyethylene resin is any one of (a) to (c), or that of any one of (a) to (c) contained in (d) the polyolefin composition when the polyethylene resin is the polyolefin composition. Each of the ultra-high-molecular-weight polyethylene in [2] (a) above, the other polyethylene than the ultra-high-molecular-weight polyethylene in [2] (b) above, and the polyethylene composition in [2] (c) above has a melting point of about 130 to 140° C. Accordingly, the melt-blending temperature is preferably 140 to 250° C., more preferably 170 to 240° C.

(2) Extrusion

When the polypropylene solution and the polyethylene solution are combined in a laminar manner in one die and then simultaneously extruded in a sheet form through the die (bonding inside the die), one die is connected to pluralities of extruders. When both solutions are extruded in a sheet form from separate dies and then laminated (bonding outside the die), each die is connected to each of plural extruders. The bonding inside the die is preferable.

In the simultaneous extrusion, any of a flat-die method and an inflation method can be used. To achieve the bonding inside the die in either method, a method of supplying each solution to each of manifolds connected to a multi-layer-forming die and laminating them in a laminar manner at a die lip (multi-manifold method), or a method of laminating the solutions in a laminar manner and then supplying the resultant laminate to a die (block method) can be used. Because the multi-manifold method and the block method per se are known, their detailed description will be omitted. A known multi-layer-forming, flat or inflation die can be used. The multi-layer-forming flat die preferably has a gap of 0.1 to 5 mm. When bonding is conducted outside the die by the flat die method, sheet-shaped solutions extruded through the dies are laminated under pressure between a pair of rolls. In any method described above, the die is heated at a temperature of 140 to 250° C. during extrusion. The extrusion speed of the heated solution is preferably 0.2 to 15 m/minute. The ratio of the microporous polypropylene layer to the microporous polyethylene resin layer can be controlled by adjusting the amounts of the polypropylene solution and the polyethylene solution extruded.

(3) Formation of Gel-Like Laminate Sheet

The resultant laminar extrudate is cooled to provide a gel-like laminate sheet. The cooling is preferably conducted to at least a gelation temperature at a speed of 50° C./minute or more. Such cooling can fix the micro-phase separation of a polypropylene phase and a polyethylene resin phase by the membrane-forming solvent. The cooling is preferably conducted to 25° C. or lower. In general, a lower cooling speed provides the gel-like laminate sheet with a coarser high-order structure, and larger pseudo-cell units constituting the high-order structure, while a higher cooling speed provides denser cell units. The cooling speed of less than 50° C./minute increases crystallization, making it difficult to form a stretchable gel-like laminate sheet. The cooling method can be a method of bringing the extrudate into direct contact with a cooling medium such as a cooling air, a cooling water, etc., a method of bring the extrudate into contact with a cooling roll, etc.

(4) Stretching of Gel-Like Laminate Sheet

The gel-like laminate sheet is subjected to two stages of stretching at different temperatures.

(i) First Stretching

After heating, the gel-like laminate sheet is stretched to a predetermined magnification by a tenter method, a roll method, an inflation method, a rolling method, or combination thereof. Because the gel-like laminate sheet contains the membrane-forming solvent, uniform stretching can be conducted. The first stretching can be monoaxial or biaxial, though the biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is preferable.

The temperature of the first stretching is in a range of −20° C. or higher and lower than +90° C. When this temperature is lower than −20° C., the microporous polypropylene layer has too large a pore size and too wide a pore size distribution, adversely affecting the shutdown speed. When this temperature is 90° C. or higher, the microporous polypropylene layer has too small permeability, not suitable for separators. The preferred stretching temperature is −20° C. to +80° C.

In the case of monoaxial stretching, the stretching magnification is preferably 2-fold or more, more preferably 3- to 30-fold. In the case of biaxial stretching, the stretching magnification is 3-fold or more in both directions, with an area magnification of preferably 9-fold or more, more preferably 25-fold or more. When the area magnification is less than 9-fold, stretching is insufficient, failing to obtain a high-modulus, high-strength, multi-layer, microporous membrane. When the area magnification is more than 400-fold, there are restrictions in stretching apparatuses, stretching operations, etc.

(ii) Second Stretching

The second stretching can be the same as the first stretching, except that the temperature is 90° C. to 135° C. When this stretching temperature exceeds 135° C., the polyethylene resin is melted, failing to provide the polyethylene resin layer with pores and to orient molecular chains of the polyethylene resin by stretching. When the stretching temperature is lower than 90° C., the polyethylene resin layer has low strength. The temperature of the second stretching is preferably 95 to 130° C.

The first and second stretching generates cleavage in polypropylene lamellas, thereby making a polypropylene phase finer to form large numbers of fibrils. The first and second stretching also generates cleavage in polyethylene lamellas, thereby making a polyethylene phase (made of the ultra-high-molecular-weight polyethylene phase, the other polyethylene than the ultra-high-molecular-weight polyethylene phase, or the polyethylene composition phase) finer to form large numbers of fibrils. The resultant fibrils constitute a three-dimensional network structure (three-dimensionally and irregularly connected network structure). With the first and second stretching temperatures within the above ranges, the resultant multi-layer, microporous polyolefin membrane is provided with high permeability and strength.

Depending on the desired properties, stretching can be conducted with a temperature distribution in a thickness direction to provide a microporous membrane with excellent mechanical strength. The details of that method are described in Japanese Patent 3,347,854.

(5) Removal of Membrane-Forming Solvent

The membrane-forming solvent is removed (washed away) using a washing solvent. Because the polypropylene phase and the polyethylene resin phase are separated from the membrane-forming solvent phase, the removal of the membrane-forming solvent provides a microporous membrane composed of fibrils constituting a fine, three-dimensional network structure, which has three-dimensionally irregularly communicating pores (voids). The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a multi-layer, microporous membrane having high porosity and permeability.

The washing of the gel-like laminate sheet can be conducted by the immersion or showering of a washing solvent or their combination. The washing solvent used is preferably 300 to 30,000 parts by mass per 100 parts by mass of the membrane. The washing temperature can usually be 15 to 30° C., and heat-washing is conducted, if necessary. The heat-washing temperature is preferably 80° C. or lower. Washing with the washing solvent is preferably conducted until the amount of the remaining liquid solvent becomes less than 1% by mass of that added.

(6) Drying of membrane

The multi-layer, microporous membrane obtained by removing the membrane-forming solvent is dried by a heat-drying method, a wind-drying method, etc. The drying temperature is preferably equal to or lower than the crystal dispersion temperature Tcd of the polyethylene resin, particularly 5° C. or more lower than the Tcd. The crystal dispersion temperature Tcd of the polyethylene resin corresponds to that of (a) the ultra-high-molecular-weight polyethylene, (b) the other polyethylene than the ultra-high-molecular-weight polyethylene or (c) the polyethylene composition when the polyethylene resin is any one of (a) to (c), or that of any one of (a) to (c) contained in (d) the polyolefin composition when the polyethylene resin is the polyolefin composition. The crystal dispersion temperature is determined by measuring the temperature characteristics of dynamic viscoelasticity according to ASTM D 4065. The ultra-high-molecular-weight polyethylene in [2] (a) above, the other polyethylene in [2] (b) above, and the polyethylene composition in [2] (c) above have crystal dispersion temperatures of about 90 to 100° C.

Drying is conducted until the percentage of the remaining washing solvent becomes preferably 5% or less by mass, more preferably 3% or less by mass, based on 100% by mass (on a dry weight basis) of the multi-layer, microporous membrane. If drying were insufficient, the subsequent re-stretching and heat treatment would undesirably provide the multi-layer, microporous membrane with reduced porosity and permeability.

(7) Hot solvent treatment

A treatment of bringing the stretched gel-like laminate sheet into contact with a hot solvent can be conducted. Solvents used in this heat treatment are preferably the above liquid membrane-forming solvent, more preferably liquid paraffin, though it can be the same as or different from the membrane-forming solvent used for preparing the polypropylene or polyethylene solution.

The hot solvent treatment method is not particularly critical as long as the stretched gel-like laminate sheet comes into contact with a hot solvent. It includes, for instance, a method of directly contacting the stretched gel-like laminate sheet with a hot solvent (simply called "direct method" unless otherwise mentioned), a method of contacting the stretched gel-like laminate sheet with a cold solvent and then heating it (simply called, "indirect method" unless otherwise mentioned), etc. The direct method includes a method of immersing the stretched gel-like laminate sheet in a hot solvent, a method of spraying a hot solvent to the stretched gel-like laminate sheet, a method of coating the stretched gel-like laminate sheet with a hot solvent, etc., and the immersing method is preferable. In the indirect method, the stretched gel-like laminate sheet is immersed in a cold solvent, sprayed with a cold solvent, or coated with a cold solvent, and then brought into contact with a heat roll, heated in an oven, or immersed in a hot solvent.

The pore size and porosity of the multi-layer, microporous membrane can be controlled by changing the hot solvent treatment temperature and time. The hot solvent temperature is preferably in a range from the crystal dispersion temperature Tcd to the melting point $Tm_2+10°$ C. Specifically, the hot solvent temperature is preferably 110 to 140° C., more preferably 115 to 135° C. The contact time is preferably 0.1 seconds to 10 minutes, more preferably 1 second to 1 minute. when the hot solvent temperature is lower than the crystal dispersion temperature Tcd, or when the contact time is less than 0.1 seconds, the hot solvent treatment provides substantially no effects of improving permeability. On the other hand, when the hot solvent temperature is higher than the melting point $Tm_2+10°$ C., or when the contact time is more than 10 minutes, the multi-layer, microporous membrane has low strength or is broken.

The above hot solvent treatment turns fibrils formed by stretching to a leaf-vein-like form with relatively thick trunks, resulting in a multi-layer, microporous membrane with a large pore size and excellent strength and permeability. The leaf-vein-like fibrils comprise thick trunk fibers and thin branch fibers extending therefrom, which is entangled to form a complicated network.

After the hot solvent treatment, washing is conducted to remove the remaining heat treatment solvent, though the heat treatment solvent can be removed together with the membrane-forming solvent.

(8) Stretching of Multi-Layer, Microporous Membrane

The dried multi-layer, microporous membrane is preferably stretched in at least one direction. The stretching of the multi-layer, microporous membrane can be conducted by a tenter method, etc. as above while heating the membrane. The stretching can be monoaxial or biaxial. The biaxial stretching can be simultaneous biaxial stretching or sequential stretching, though the simultaneous biaxial stretching is preferable.

The stretching temperature is preferably 135° C. or lower, more preferably 90 to 135° C., particularly 95 to 130° C. When the stretching temperature is higher than 135° C., the resultant membrane has low compression resistance, and there is large unevenness in properties (particularly, air permeability) in a width direction when stretched in a transverse direction (TD). When the stretching temperature is lower than 90° C., uniform stretching cannot be conducted.

The stretching magnification in one direction is preferably 1.1- to 2.5-fold, to provide the multi-layer, microporous membrane with larger pore diameters and improved compression resistance. In the case of monoaxial stretching, for instance, the stretching magnification is 1.1- to 2.5-fold in either a longitudinal direction (MD) or TD. In the case of biaxial stretching, the stretching magnification is 1.1- to 2.5-fold in both MD and TD. In the biaxial stretching, the stretching magnification can be the same or different between MD and TD as long as it is 1.1- to 2.5-fold, though it is preferable the same between MD and TD. When this magnification is less than 1.1-fold, sufficient compression resistance cannot be obtained. When this magnification is more than 2.5-fold, the membrane is highly likely broken and has undesirably low heat shrinkage resistance. The stretching magnification is more preferably 1.1- to 2.0-fold.

(9) Heat Treatment

The dried multi-layer, microporous polyethylene membrane is preferably heat-treated. The heat treatment stabilizes crystals, thereby making lamellas more uniform. The heat treatment can be heat-setting and/or annealing. The heat-setting is conducted more preferably by a tenter method, a roll method or a rolling method. The heat-setting is conducted at the melting point $Tm_2+10°$ C. or lower, preferably at a temperature in a range from the crystal dispersion temperature Tcd to the melting point $Tm_2$.

The annealing can be conducted using a belt conveyer or an air-floating furnace in addition to the above method. The annealing is conducted at the melting point $Tm_2$ or lower, preferably at a temperature in a range from 60° C. to the melting point $Tm_2$-10° C. The above annealing provides a multi-layer, microporous membrane having high permeability and strength. Many steps of the heat-setting and the annealing can be combined.

(10) Cross-Linking of Membrane

The dried multi-layer, microporous membrane is preferably cross-linked by ionizing radiation such as α-rays, β-rays, γ-rays, electron beams, etc. The electron beam irradiation is preferably conducted at 0.1 to 100 Mrad and accelerating voltage of 100 to 300 kV. The cross-linking treatment elevates the meltdown temperature of the multi-layer, microporous membrane.

(11) Hydrophilizing

The dried multi-layer, microporous membrane can be hydrophilized. The hydrophilizing can be conducted by a monomer-grafting treatment, a surfactant treatment, a corona discharge treatment, etc. The monomer-grafting treatment is preferably conducted after the cross-linking.

In case of the surfactant treatment, any of nonionic surfactants, cationic surfactants, anionic surfactants and amphoteric surfactants can be used, but the nonionic surfactants are preferable. The multi-layer, microporous membrane is dipped in a solution of the surfactant in water or a lower alcohol such as methanol, ethanol, isopropyl alcohol, etc., or coated with the solution by a doctor blade method.

(12) Surface-Coating

The dried multi-layer, microporous membrane can be coated with porous polypropylene, a porous fluororesin such as polyvinylidene fluoride and polytetrafluoroethylene, porous polyimide, porous polyphenylene sulfide, etc., to improve meltdown properties when used as a battery separator. Polypropylene for a coating layer preferably has Mw of 5,000 to 500,000 and solubility of 0.5 g or more in 100 g of toluene at a temperature of 25° C. This polypropylene more preferably has a racemic diad fraction of 0.12 to 0.88. In the racemic diad, two connected monomer units are in an enantiomer relation. The surface-coating layer can be formed, for instance, by coating the multi-layer, microporous membrane with a mixed solution containing a resin for the above coating layer and its good solvent, removing the good solvent to increase the concentration of the resin, thereby forming a structure in which a resin phase is separated from a good solvent phase, and then removing the remaining good solvent.

(b) Second Production Method

The second production method comprises the steps of (1) preparing a polypropylene solution and a polyethylene solution in the same manner as in the first method, (2) extruding the polypropylene solution and the polyethylene solution through separate dies, (3) cooling the resultant extrudates to provide gel-like sheets, (4) subjecting each gel-like sheet to two-stage stretching at different temperatures (−20° C. or higher and lower than +90° C. in the first stage, and 90° C. to 135° C. in the second stage), (5) removing the membrane-forming solvent, (6) drying the resultant microporous polypropylene membrane and microporous polyethylene membrane, and (7) laminating them. If necessary, a hot solvent treatment step (8) can be conducted between the steps (4) and (5), a heat treatment step (9) and a step (10) of stretching the microporous membrane can be conducted between the steps (6) and (7), and a cross-linking step (11) with ionizing radiations, a hydrophilizing step (12), and a surface-coating step (13), etc. can be conducted after the step (7).

Among the above steps, the step (2) can be the same as in the first method except for extruding the polypropylene solution and the polyethylene solution through separate dies. The step (3) can be the same as in the first method except for forming separate gel-like sheets. The step (4) can be the same as in the first method except that separate gel-like sheets are subjected to two-stage stretching at different temperatures. The step (5) can be the same as in the first method except for removing the membrane-forming solvent from separate gel-like sheets. The step (6) can be the same as in the first method except for drying the microporous polypropylene membrane and the microporous polyethylene membrane. The hot solvent treatment step (8) between the steps (4) and (5) can be the same as in the first method except that it is conducted on either one of the gel-like polypropylene sheet and the gel-like polyethylene resin sheet. The heat treatment step (9) and the step (10) of stretching the microporous membrane between the steps (6) and (7) can be the same as in the first method except that they are conducted either one of the microporous polypropylene membrane and the microporous polyethylene membrane. Any of the cross-linking step (11), the hydrophilizing step (12), and the surface-coating step (13) after the step (7) can be the same as in the first method.

Accordingly, the step (7) of alternately laminating the microporous polypropylene membrane and the microporous polyethylene membrane will be described. Though not particularly critical, the laminating method is preferably a heat-laminating method. The heat-laminating method includes a heat-sealing method, an impulse-sealing method, an ultrasonic laminating method, etc., and the heat-sealing method is preferable. The heat-sealing method preferably uses a heat roll. In the heat roll method, the overlapped microporous polypropylene membrane and microporous polyethylene membrane are heat-sealed by passing through a pair of heat rolls or between a heat roll and a table. The heat-sealing temperature and pressure are not particularly critical, as long as the microporous polypropylene membrane and the microporous polyethylene membrane are sufficiently bonded, without deteriorating the properties of the resultant multi-layer, microporous membrane. The heat-sealing temperature is, for instance, 90 to 135° C., preferably 90 to 125° C. The heat-sealing pressure is preferably 0.01 to 50 MPa.

(c) Third Production Method

The third production method comprises the steps of (1) (i) melting a polypropylene, (ii) preparing a polyethylene solution in the same manner as in the first method, (2) simultaneously extruding the polypropylene melt and the polyethylene solution through a die, (3) cooling the resultant extrudate to provide a laminate sheet, (4) subjecting the resultant laminate sheet to two-stage stretching at different temperatures (first stage: −20° C. to +70° C., second stage: 90° C. to 135° C.), (5) removing the membrane-forming solvent, and (6) drying the membrane. If necessary, a hot solvent treatment step (7) can be conducted between the steps (4) and (5), and a heat treatment step (8), a step (9) of stretching the multi-layer, microporous membrane, a cross-linking step (10) with ionizing radiations, a hydrophilizing step (11), a surface-coating step (12), etc. can be conducted after the step (6).

Among the above steps, the step (1) (i) of melting a polypropylene can be the same as in the first method except that a membrane-forming solvent is not used. Polypropylene is melted in the double-screw extruder at a temperature in a range from the melting point $Tm_1$ to $Tm_1+90°$ C. The step (2) can be the same as in the first method except that the polypropylene melt and the polyethylene solution are simultaneously extruded through a die. The step (3) can be the same as in the first method except that an extrudate of the polypropylene melt and the polyethylene solution is cooled.

The step (4) can be the same as in the first method, except that the laminate sheet of the polypropylene layer and the gel-like polyethylene resin layer is subjected to first stretching at a temperature from $-20°$ C. to $+70°$ C., and second stretching at a temperature from $90°$ C. to $135°$ C. When the first stretching temperature is lower than $-20°$ C., the microporous polypropylene layer has too large a pore size and too wide a pore size distribution, adversely affecting the shutdown speed. When the first stretching temperature is higher than $70°$ C., the microporous polypropylene layer has too small permeability, not suitable for separators. The preferred first stretching temperature is $-10°$ C. to $+60°$ C. With the first and second stretching temperatures within the above ranges, a multi-layer, microporous membrane having high permeability and high strength can be obtained. The first and second stretching magnifications can be the same as in the first method.

The steps (5) and (7) can be the same as in the first method, except for treating the laminate sheets of the polypropylene layer and the gel-like polyethylene resin layer. The steps (6) and (8) to (12) can be the same as in the first method.

(d) Fourth Production Method

The fourth production method comprises the steps of (1) (i) melting a polypropylene in the same manner as in the third production method, (ii) preparing a polyethylene solution in the same manner as in the first method, (2) extruding the polypropylene melt and the polyethylene solution through separate dies, (3) cooling the resultant extrudates to provide a polypropylene sheet and a gel-like polyethylene resin sheet, (4) subjecting the polypropylene sheet and the gel-like polyethylene resin sheet to two-stage stretching at different temperatures (first stage: $-20°$ C. to $+70°$ C., second stage: $90°$ C. to $135°$ C.) to form a microporous polypropylene membrane and a stretched gel-like polyethylene resin sheet, (5) removing the membrane-forming solvent from the stretched gel-like polyethylene resin sheet, (6) drying the washed membrane to obtain a microporous polyethylene membrane, and (7) laminating the microporous polypropylene membrane and the microporous polyethylene membrane.

If necessary, a hot solvent treatment step (8) can be conducted between the steps (4) and (5), any of a heat treatment step (9) and a step (10) of stretching the microporous polypropylene membrane or the microporous polyethylene membrane can be conducted between the steps (6) and (7), and a cross-linking step (11) with ionizing radiations, a hydrophilizing step (12), a surface-coating step (13), etc. can be conducted after the step (7).

Among the above steps, the step (2) can be the same as in the first method except for extruding the polypropylene melt and the polyethylene solution through separate dies. The step (3) can be the same as in the first method except for separately cooling a polypropylene melt extrudate and a polyethylene solution extrudate. The step (4) can be the same as in the third method except for subjecting the polypropylene sheet and the gel-like polyethylene resin sheet to two-stage stretching at different temperatures (first stage: $-20°$ C. to $+70°$ C., second stage: $90°$ C. to $135°$ C.). The step (5) can be the same as in the first method except for removing the membrane-forming solvent from the stretched gel-like polyethylene resin sheet. The step (6) can be the same as in the first method except for drying the microporous polyethylene membrane. The hot solvent treatment step between the steps (4) and (5) can be the same as in the first method except that it is conducted on either one of the stretched polypropylene sheet and the gel-like polyethylene resin sheet. The heat treatment step (9) and the step (10) of stretching the microporous membrane between the steps (6) and (7) can be the same as in the first method except that they are conducted on either one of the microporous polypropylene membrane and the microporous polyethylene membrane. The laminating step (7) can be the same as in the second method. Any of the cross-linking step (11), the hydrophilizing step (12), and the surface-coating step (13) after the step (7) can be the same as in the first method. Accordingly, their detailed description will be omitted.

[3] Multi-Layer, Microporous Polyolefin Membrane

The multi-layer, microporous polyolefin membranes according to preferred embodiments of this invention have the following properties.

(a) Porosity of 25 to 80%

With the porosity of less than 25%, the multi-layer, microporous polyolefin membrane does not have good air permeability. When the porosity exceeds 80%, the multi-layer, microporous membrane used as a battery separator does not have enough strength, resulting in a high likelihood of short-circuiting between electrodes.

(b) Air Permeability of 20 to 400 Seconds/100 cm$^3$ (Converted to the Value at 20-μm Thickness)

When the air permeability is in a range from 20 to 400 seconds/100 cm$^3$, batteries having separators formed by the multi-layer, microporous polyolefin membrane have large capacity and good cycle characteristics. When the air permeability is more than 400 seconds/100 cm$^3$, batteries have small capacity. When the air permeability is less than 20 seconds/100 cm$^3$, shutdown does not fully occur when the temperature is elevated in the batteries.

(c) Pin Puncture Strength of 3,000 mN/20 μm or More

With the pin puncture strength of less than 3,000 mN/20 μm, a battery comprising the multi-layer, microporous polyolefin membrane as a separator likely suffers short-circuiting between electrodes.

(d) Tensile Rupture Strength of 80,000 kPa or More

With the tensile rupture strength of 80,000 kPa or more in both longitudinal direction (MD) and transverse direction (TD), the membrane is unlikely ruptured when used as a battery separator.

(e) Tensile Rupture Elongation of 100% or More

With the tensile rupture elongation of 100% or more in both longitudinal direction (MD) and transverse direction (TD), the membrane is unlikely ruptured when used as a battery separator.

(f) Heat Shrinkage Ratio of 10% or Less

The heat shrinkage ratio after exposed to 105° C. for 8 hours is 10% or less in both longitudinal direction (MD) and transverse direction (TD). When the heat shrinkage ratio exceeds 10%, battery separators formed by the multi-layer, microporous polyolefin membrane shrink by heat generated by the batteries, resulting in high likelihood of short-circuiting in their end portions. The heat shrinkage ratio is preferably 8% or less in both MD and TD.

(g) Shutdown Temperature of 140° C. or Lower

When the shutdown temperature is higher than 140° C., the multi-layer, microporous membrane used as a lithium battery separator has slow shutdown response when overheated.

(h) Meltdown Temperature of 160° C. or Higher

The meltdown temperature is preferably 160 to 190° C.

(i) Shutdown Speed of 20 Seconds or Less

When the shutdown speed (135° C.) is more than 20 seconds, the multi-layer, microporous membrane used as a lithium battery separator has slow shutdown response when overheated.

[4] Battery Separator

Though properly selectable depending on the types of batteries, the thickness of a battery separator formed by the multi-layer, microporous polyolefin membrane is preferably 5 to 50 μm, more preferably 10 to 35 μm.

Though not critical, the battery separator preferably has a two-layer structure comprising the microporous polypropylene layer and the microporous polyethylene resin layer, or a three-layer structure of microporous polyethylene resin layer/microporous polypropylene layer/microporous polyethylene resin layer. Though not critical, the mass ratio of the microporous polypropylene layer to the microporous polyethylene resin layer is preferably 70/30 to 10/90, more preferably 60/40 to 20/80.

This invention will be described in more detail with reference to Examples below without intention of restricting the scope of this invention.

Example 1

(1) Preparation of Polypropylene Solution 100 parts by mass of polypropylene (PP) having a mass-average molecular weight (Mw) of $5.7 \times 10^5$ were dry-blended with 0.2 parts by mass of tetrakis[methylene-3-(3, 5-ditertiary-butyl-4-hydroxyphenyl)-propionate] methane with as an antioxidant. The melting point of PP was 165° C.

The Mw of PP was measured by a permeation chromatography (GPC) method under the flowing conditions gel (hereinafter the same condition applied to the Examples below).

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer available from Waters Corp., and
Calibration curve: Produced from a calibration curve of a single-dispersion, standard polystyrene sample using a predetermined conversion constant.

50 parts by mass of the resultant mixture was charged into a double-screw extruder, and 50 parts by mass of liquid paraffin was supplied to the double-screw extruder via its side feeder. Melt blending was conducted at 230° C. and 250 rpm to prepare a polypropylene solution.

(2) Preparation of Polyethylene Solution

Dry-blended were 100 parts by mass of a polyethylene (PE) composition comprising 18% by mass of ultra-high-molecular-weight polyethylene (UHMWPE) having Mw of $2.0 \times 10^6$ and 82% by mass of high-density polyethylene (HDPE) having Mw of $3.5 \times 10^5$, with 0.2 parts by mass of tetrakis[methylene-3-(3,5-ditertiary-butyl-4-hydroxyphenyl)-propionate] methane. Measurement revealed that the PE composition comprising UHMWPE and HDPE had a melting point of 135° C. and a crystal dispersion temperature of 100° C. The Mw of UHMWPE and HDPE was measured by GPC under the same conditions as above.

30 parts by mass of the resultant mixture was charged into a double-screw extruder, and 70 parts by mass of liquid paraffin was supplied to the double-screw extruder via its side feeder. Melt blending was conducted at 230° C. and 250 rpm to prepare a polyethylene solution.

(3) Composition of Membrane

The polypropylene solution and the polyethylene solution were supplied from separate double-screw extruders to a two-layer-forming T die, and extruded at a thickness ratio of 1/1 from the T die. The extrudate was cooled while taking off by a cooling roll controlled at 0° C., to form a two-layer, gel-like sheet. The two-layer, gel-like sheet was simultaneously and biaxially stretched to 2-fold in both longitudinal direction (MD) and transverse direction (TD) by a tenter at 60° C., and further simultaneously and biaxially stretched to 2.5-fold in both MD and TD at 116° C. Fixed to an aluminum frame plate of 20 cm×20 cm, the stretched two-layer, gel-like sheet was immersed in a washing bath of methylene chloride controlled at 25° C., washed with the vibration of 100 rpm for 3 minutes to remove the liquid paraffin. The washed membrane was air-dried at room temperature, fixed to a tenter, and annealed at 126° C. for 10 minutes to produce a two-layer, microporous polyolefin membrane.

Example 2

A two-layer, microporous polyolefin membrane was produced in the same manner as in Example 1 except that the washed and dried two-layer, microporous membrane was stretched to 1.2-fold in TD at 126° C. by a tenter and annealed.

Example 3

(1) Production of Microporous Polypropylene Membrane

A polypropylene solution was prepared, extruded from a T die attached to a tip end of a double-screw extruder, and cooled while taking off by a cooling roll controlled at 0° C. in the same manner as in Example 1, to form a gel-like polypropylene sheet. The gel-like polypropylene sheet was simultaneously and biaxially stretched at 60° C. and 116° C., respectively, washed, air-dried, and annealed to produce a microporous polypropylene membrane in the same manner as in Example 1.

(2) Production of Microporous Polyethylene Membrane

A polyethylene solution was prepared in the same manner as in Example 1. The polyethylene solution was extruded and cooled to form a gel-like polyethylene resin sheet in the same manner as in (1) above. The gel-like polyethylene resin sheet was simultaneously and biaxially stretched at 60° C. and 116° C., respectively, washed, air-dried, and annealed to produce a microporous polyethylene membrane in the same manner as in Example 1.

(3) Lamination

The microporous polypropylene membrane and the microporous polyethylene membrane were laminated, and bonded at a pressure of 0.05 MPa by passing through a pair of rolls heated at 120° C. to produce a two-layer, microporous polyolefin membrane (thickness ratio of microporous PP membrane/microporous PE membrane=1/1).

Example 4

A two-layer, microporous polyolefin membrane was produced in the same manner as in Example 3, except that the stretched gel-like polypropylene sheet and the gel-like polyethylene resin sheet were immersed in a liquid paraffin bath controlled at 120° C. for 5 seconds, and then washed.

Comparative Example 1

A two-layer, microporous polyolefin membrane was produced in the same manner as in Example 1 except that the two-layer, gel-like sheet was simultaneously and biaxially stretched to 5-fold in both MD and TD at 115° C., and then annealed at a temperature of 125° C.

Comparative Example 2

A two-layer, microporous polyolefin membrane was produced in the same manner as in Example 1, except that the temperature of the first stretching was −100° C., that the temperature of the second stretching was 115° C., and that the annealing temperature was 125° C.

The properties of the two-layer, microporous polyolefin membranes obtained in Examples 1 to 4 and Comparative Examples 1, 2 were measured by the following methods. The results are shown in Table 1.

(1) Average Thickness (μm)

The thickness of the multi-layer, microporous membrane was measured at a 5-mm longitudinal interval over a width of 30 cm by a contact thickness meter, and the measured thickness was averaged.

(2) Air Permeability (Seconds/100 cm³/20 μm)

The air permeability $P_1$ of the multi-layer, microporous membrane having a thickness $T_1$ was measured according to JIS P8117, and converted to air permeability $P_2$ at a thickness of 20 μm by the formula of $P_2 = (P_1 \times 20)/T_1$.

(3) Porosity (%)

It was measured by a mass method.

(4) Pin Puncture Strength (mN/20 μm)

The maximum load was measured when a multi-layer, microporous membrane having a thickness $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2 = (L_1 \times 20)/T_1$, which was regarded as pin puncture strength.

(5) Tensile Rupture Strength and Tensile Rupture Elongation

Measurement was conducted on a 10-mm-wide rectangular test piece according to ASTM D882.

(6) Heat shrinkage Ratio (%)

The shrinkage ratio of a multi-layer, microporous membrane after exposed to 105° C. for 8 hours was measured three times in both longitudinal direction (MD) and transverse direction (TD) and averaged.

(7) Shutdown Temperature

Using a thermomechanical analyzer (TMA/SS6000 available from Seiko Instruments, Inc.), a test piece of 10 mm (TD)×3 mm (MD) was heated from room temperature at a speed of 5° C./minute while being longitudinally drawn under a load of 2 g. A temperature at an inflection point observed near the melting point was regarded as a shutdown temperature.

(8) Meltdown Temperature (° C.)

Using the above thermomechanical analyzer, a test piece of 10 mm (TD)×3 mm (MD) was heated from room temperature at a speed of 5° C./minute while longitudinally drawing by a load of 2 g, to measure a temperature at which the membrane was broken by melting.

(9) Shutdown Speed

Each multi-layer, microporous membrane was heat-treated by contact with a plate controlled at 135° C. for various periods of time and then measured with respect to air permeability. A time period (second) until the air permeability reached 100,000 seconds/100 cm³ (converted to the value of 20-μm thickness) was regarded as a shutdown speed.

TABLE 1

| | | No. | | |
|---|---|---|---|---|
| | | Example 1 | Example 2 | Example 3 |
| Resin Composition | | | | |
| PP Mw[(1)]/% by mass | | $5.7 \times 10^5/100$ | $5.7 \times 10^5/100$ | $5.7 \times 10^5/100$ |
| PE Composition | | | | |
| UHMWPE Mw[(1)]/% by mass | | $2.0 \times 10^6/18$ | $2.0 \times 10^6/18$ | $2.0 \times 10^6/18$ |
| HDPE Mw[(1)]/% by mass | | $3.5 \times 10^5/82$ | $3.5 \times 10^5/82$ | $3.5 \times 10^5/82$ |
| Production Conditions | | | | |
| PP Concentration (% by mass) | | 50 | 50 | 50 |
| PE Composition Concentration (% by mass) | | 30 | 30 | 30 |

TABLE 1-continued

| Extrudate | | | |
|---|---|---|---|
| Layer Structure[2] | PP/PE | PP/PE | — |
| Layer Thickness Ratio | 1/1 | 1/1 | — |
| First Stretching | | | |
| Gel-Like Laminate Sheet Temp. (° C.)/Magnification (MD × TD)[3] | 60/2 × 2 | 60/2 × 2 | —/— |
| Gel-Like Polypropylene Sheet Temp. (° C.)/Magnification (MD × TD)[3] | —/— | —/— | 60/2 × 2 |
| Gel-Like Polyethylene Resin Sheet Temp. (° C.)/Magnification (MD × TD)[3] | —/— | —/— | 60/2 × 2 |
| Second Stretching | | | |
| Gel-Like Laminate Sheet Temp. (° C.)/Magnification (MD × TD)[3] | 116/2.5 × 2.5 | 116/2.5 × 2.5 | —/— |
| Gel-Like Polypropylene Sheet Temp. (° C.)/Magnification (MD × TD)[3] | —/— | —/— | 116/2.5 × 2.5 |
| Gel-Like Polyethylene Resin Sheet Temp. (° C.)/Magnification (MD × TD)[3] | —/— | —/— | 116/2.5 × 2.5 |
| Hot Solvent Treatment | | | |
| Gel-Like Laminate Sheet Solvent/Temp. (° C.)/Time (second) | —/—/— | —/—/— | —/—/— |
| Gel-Like Polypropylene Sheet Solvent/Temp. (° C.)/Time (second) | —/—/— | —/—/— | —/—/— |
| Gel-Like Polyethylene Resin Sheet Solvent/Temp. (° C.)/Time (second) | —/—/— | —/—/— | —/—/— |
| Stretching of Microporous Membrane | | | |
| Multi-Layer, Microporous Membrane Temp. (° C.)/Stretching Direction/Magnification | —/—/— | 126/TD/1.2 | —/—/— |
| Microporous Polypropylene Membrane Temp. (° C.)/Stretching Direction/Magnification | —/—/— | —/—/— | —/—/— |
| Microporous Polyethylene Membrane Temp. (° C.)/Stretching Direction/Magnification | —/—/— | —/—/— | —/—/— |
| Annealing | | | |
| Multi-Layer, Microporous Membrane Temp. (° C.)/Time (minute) | 126/10 | 126/10 | —/— |
| Microporous Polypropylene Membrane Temp. (° C.)/Time (minute) | —/— | —/— | 126/10 |
| Microporous Polyethylene Membrane Temp. (° C.)/Time (minute) | —/— | —/— | 126/10 |
| Lamination | | | |
| Temp. (° C.)/Pressure (MPa) | —/— | —/— | 120/0.05 |
| Layer Structure[4] | — | — | PP/PE |
| Layer Thickness Ratio | — | — | 1/1 |
| Properties of Multi-Layer, Microporous Membrane | | | |
| Average Thickness (μm) | 27.2 | 25.2 | 33 |
| Air Permeability (seconds/100 cm$^3$/20 μm) | 395 | 315 | 455 |
| Porosity (%) | 42 | 44 | 41 |
| Pin Puncture Strength (g/20 μm, mN/20 μm) | 420/4,116 | 435/4,263 | 420/4,116 |
| Tensile Strength (kg/cm$^2$, kPa) | | | |
| MD | 1,020/99,960 | 1,050/102,900 | 1,010/98,980 |
| TD | 925/90,650 | 995/97,510 | 915/89,670 |
| Tensile Elongation (%) | | | |
| MD/TD | 125/190 | 135/160 | 125/190 |
| Heat Shrinkage Ratio (%) | | | |
| MD/TD | 7/6 | 6/8 | 5/5 |
| Shutdown Temp. (° C.) | 135 | 135 | 135 |
| Meltdown Temp. (° C.) | 175 | 175 | 175 |
| Shutdown Speed (sec) | 10 | 15 | 10 |

| | No. | | |
|---|---|---|---|
| | Example 4 | Comp. Ex. 1 | Comp. Ex. 2 |
| Resin Composition | | | |
| PP Mw[1]/% by mass | 5.7 × 10$^5$/100 | 5.7 × 10$^5$/100 | 5.7 × 10$^5$/100 |
| PE Composition | | | |
| UHMWPE Mw[1]/% by mass | 2.0 × 10$^6$/18 | 2.0 × 10$^6$/18 | 2.0 × 10$^6$/18 |
| HDPE Mw[1]/% by mass | 3.5 × 10$^5$/82 | 3.5 × 10$^5$/82 | 3.5 × 10$^5$/82 |

TABLE 1-continued

| Production Conditions | | | |
|---|---|---|---|
| PP Concentration (% by mass) | 50 | 50 | 50 |
| PE Composition Concentration (% by mass) | 30 | 30 | 30 |
| Extrudate | | | |
| Layer Structure[(2)] | — | PP/PE | PP/PE |
| Layer Thickness Ratio | — | 1/1 | 1/1 |
| First Stretching | | | |
| Gel-Like Laminate Sheet Temp. (° C.)/Magnification (MD × TD)[(3)] | —/— | —/— | −100/2 × 2 |
| Gel-Like Polypropylene Sheet Temp. (° C.)/Magnification (MD × TD)[(3)] | 60/2 × 2 | —/— | —/— |
| Gel-Like Polyethylene Resin Sheet Temp. (° C.)/Magnification (MD × TD)[(3)] | 60/2 × 2 | —/— | —/— |
| Second Stretching | | | |
| Gel-Like Laminate Sheet Temp. (° C.)/Magnification (MD × TD)[(3)] | —/— | 115/5 × 5 | 115/2.5 × 2.5 |
| Gel-Like Polypropylene Sheet Temp. (° C.)/Magnification (MD × TD)[(3)] | 116/2.5 × 2.5 | —/— | —/— |
| Gel-Like Polyethylene Resin Sheet Temp. (° C.)/Magnification (MD × TD)[(3)] | 116/2.5 × 2.5 | —/— | —/— |
| Hot Solvent Treatment | | | |
| Gel-Like Laminate Sheet Solvent/Temp. (° C.)/Time (second) | —/—/— | —/—/— | —/—/— |
| Gel-Like Polypropylene Sheet Solvent/Temp. (° C.)/Time (second) | LP[(5)]/120/5 | —/—/— | —/—/— |
| Gel-Like Polyethylene Resin Sheet Solvent/Temp. (° C.)/Time (second) | LP[(5)]/120/5 | —/—/— | —/—/— |
| Stretching of Microporous Membrane | | | |
| Multi-Layer, Microporous Membrane Temp. (° C.)/Stretching Direction/Magnification | —/—/— | —/—/— | —/—/— |
| Microporous Polypropylene Membrane Temp. (° C.)/Stretching Direction/Magnification | —/—/— | —/—/— | —/—/— |
| Microporous Polyethylene Membrane Temp. (° C.)/Stretching Direction/Magnification | —/—/— | —/—/— | —/—/— |
| Annealing | | | |
| Multi-Layer, Microporous Membrane Temp. (° C.)/Time (minute) | —/— | 125/10 | 125/10 |
| Microporous Polypropylene Membrane Temp. (° C.)/Time (minute) | 126/10 | —/— | —/— |
| Microporous Polyethylene Membrane Temp. (° C.)/Time (minute) | 126/10 | —/— | —/— |
| Lamination | | | |
| Temp. (° C.)/Pressure (MPa) | 120/0.05 | —/— | —/— |
| Layer Structure[(4)] | PP/PE | — | — |
| Layer Thickness Ratio | 1/1 | — | — |
| Properties of Multi-Layer, Microporous Membrane | | | |
| Average Thickness (μm) | 30 | 24 | 22 |
| Air Permeability (seconds/100 cm³/20 μm) | 280 | 990 | 360 |
| Porosity (%) | 46 | 37 | 43.5 |
| Pin Puncture Strength (g/20 μm, mN/20 μm) | 310/3,038 | 390/3,822 | 435/4,263 |
| Tensile Strength (kg/cm², kPa) | | | |
| MD | 890/87,220 | 980/96,040 | 1,090/106,820 |
| TD | 780/76,440 | 870/85,260 | 990/97,020 |
| Tensile Elongation (%) | | | |
| MD/TD | 145/210 | 125/160 | 145/210 |
| Heat Shrinkage Ratio (%) | | | |
| MD/TD | 5/2 | 8/7 | 9/7 |
| Shutdown Temp. (° C.) | 135 | 135 | 135 |
| Meltdown Temp. (° C.) | 175 | 175 | 175 |
| Shutdown Speed (sec) | 10 | 65 | 90 |

Note:
[(1)]Mw represents a mass-average molecular weight.
[(2)]PP represents a polypropylene solution, and PE represents a polyethylene solution.
[(3)]MD represents a longitudinal direction, and TD represents a transverse direction.
[(4)]PP represents a microporous polypropylene membrane, and PE represents a microporous polyethylene membrane.
[(5)]LP represents liquid paraffin.

Because the gel-like (two-layer) sheet was stretched at a temperature of −20° C. or higher and lower than +90° C., and then re-stretched at a temperature from 90° C. to 135° C. in Examples 1 to 4, a multi-layer, microporous membrane with well-balanced permeability, mechanical strength, heat shrinkage resistance, shutdown properties and meltdown properties was obtained. On the other hand, because a two-layer, gel-like sheet was stretched only at 115° C. in Comparative Example 1, the resultant multi-layer, microporous membrane had poorer air permeability and a slower shutdown speed than those of Examples 1 to 4. Accordingly, the multi-layer, microporous membrane of Comparative Example 1 would be easily short-circuited if it were used as a separator for large-capacity batteries. Because the first stretching of the two-layer, gel-like sheet was conducted at a temperature lower than −20° C. in Comparative Example 2, the multi-layer, microporous membrane of Comparative Example 2 has a slower shutdown speed than those of Examples 1 to 4. Accordingly, it would be impossible to prevent troubles such as the ignition of batteries, etc. if the multi-layer, microporous membrane were used as a separator.

Example 5

(1) Preparation of Polypropylene Melt 100 parts by mass of PP (melting point 165° C.) having Mw of $5.3 \times 10^5$ were dry-blended with 0.2 parts by mass of tetrakis[methylene-3-(3,5-ditertiary-butyl-4-hydroxyphenyl)-propionate] methane. The resultant mixture was charged into a double-screw extruder, and melted at 230° C. and 250 rpm to prepare a polypropylene melt.

(2) Preparation of Polyethylene Solution

A polyethylene solution was prepared in the same manner as in Example 1.

(3) Composition of Membrane

The polypropylene melt and the polyethylene solution were supplied from separate double-screw extruders to a three-layer-forming T die, and extruded from the T die in the form of a laminate of PE solution/PP melt/PE solution (thickness ratio of PE solution/PP melt/PE solution=1/1/1). The extrudate was cooled while taking off by a cooling roll controlled at 0° C., to form a three-layer, sheet. The three-layer, sheet was simultaneously and biaxially stretched at 60° C. and 116° C., respectively, washed, air-dried and annealed in the same manner as in Example 1, to produce a three-layer, microporous polyolefin membrane.

Example 6

A three-layer, microporous polyolefin membrane was produced in the same manner as in Example 5, except that the washed and dried three-layer, microporous membrane was stretched to 1.2-fold in TD at 126° C. by a tenter, and annealed.

Example 7

(1) Production of Microporous Polypropylene Membrane

A polypropylene melt was prepared in the same manner as in Example 5. The polypropylene melt was extruded from a T die attached to a tip end of a double-screw extruder, and cooled while taking off by a cooling roll controlled at 0° C., to form a polypropylene sheet. The polypropylene sheet was simultaneously and biaxially stretched at 60° C. and 116° C., respectively, and annealed to produce a microporous PP membrane in the same manner as in Example 1.

(2) Production of Microporous Polyethylene Membrane

A microporous PE membrane was produced in the same manner as in Example 3.

(3) Lamination

The microporous PP membrane and the microporous PE membrane were laminated in the order of the microporous PE membrane, the microporous PP membrane and the microporous PE membrane, and bonded together at a pressure of 0.05 MPa by passing through a pair of rolls heated at 120° C. to produce a three-layer, microporous polyolefin membrane (thickness ratio of microporous PE membrane/microporous PP membrane/microporous PE membrane=1/1/1).

Comparative Example 3

A three-layer, microporous polyolefin membrane was produced in the same manner as in Example 5, except that the cooled three-layer, sheet was simultaneously and biaxially stretched to 5-fold in both MD and TD at 115° C., and annealed at 125° C.

Comparative Example 4

The polypropylene melt and the polyethylene solution prepared in the same manner as in Example 5 were supplied from separate double-screw extruders to a two-layer-forming T die, and extruded at a thickness ratio of 1/1 from the T die. The extrudate was cooled while taking off by a cooling roll controlled at 0° C. to form a two-layer sheet. A two-layer, microporous polyolefin membrane was produced in the same manner as in Example 5, except that the above two-layer sheet was subjected to the first stretching at −100° C. and the second stretching at 115° C., and annealed at 125° C.

The properties of the multi-layer, microporous polyolefin membranes obtained in Examples 5 to 7 and Comparative Examples 3, 4 were measured in the same manner as above. In a transmission electron photomicrograph (TEM photograph) showing a cross section of the multi-layer, microporous membrane, 50 pores (voids) were arbitrarily selected in the PP layer to measure diameters of the pores (widths of the voids), and averaged to determine the average pore diameter of the PP layer. The results are shown in Table 2.

TABLE 2

| | No. | | |
|---|---|---|---|
| | Example 5 | Example 6 | Example 7 |
| Resin Composition | | | |
| PP Mw[(1)]/% by mass | $5.3 \times 10^5$/100 | $5.3 \times 10^5$/100 | $5.3 \times 10^5$/100 |
| PE Composition | | | |
| UHMWPE Mw[(1)]/% by mass | $2.0 \times 10^6$/18 | $2.0 \times 10^6$/18 | $2.0 \times 10^6$/18 |
| HDPE Mw[(1)]/% by mass | $3.5 \times 10^5$/82 | $3.5 \times 10^5$/82 | $3.5 \times 10^5$/82 |
| Production Conditions | | | |
| PP Concentration (% by mass) | 100 | 100 | 100 |
| PE Composition Concentration (% by mass) | 30 | 30 | 30 |
| Extrudate | | | |
| Layer Structure[(2)] | PE/PP/PE | PE/PP/PE | — |
| Layer Thickness Ratio | 1/1/1 | 1/1/1 | — |
| First Stretching | | | |
| Laminate Sheet Temp. (° C.)/Magnification (MD × TD)[(3)] | 60/2 × 2 | 60/2 × 2 | —/— |
| Polypropylene Sheet Temp. (° C.)/Magnification (MD × TD)[(3)] | —/— | —/— | 60/2 × 2 |
| Gel-Like Polyethylene Resin Sheet Temp. (° C.)/Magnification (MD × TD)[(3)] | —/— | —/— | 60/2 × 2 |
| Second Stretching | | | |
| Laminate Sheet Temp. (° C.)/Magnification (MD × TD)[(3)] | 116/2.5 × 2.5 | 116/2.5 × 2.5 | —/— |
| Polypropylene Sheet Temp. (° C.)/Magnification (MD × TD)[(3)] | —/— | —/— | 116/2.5 × 2.5 |
| Gel-Like Polyethylene Resin Sheet Temp. (° C.)/Magnification (MD × TD)[(3)] | —/— | —/— | 116/2.5 × 2.5 |
| Stretching of Microporous Membrane | | | |
| Multi-Layer, Microporous Membrane Temp. (° C.)/Direction/Magnification | —/—/— | 126/TD/1.2 | —/—/— |
| Microporous Polypropylene Membrane Temp. (° C.)/Direction/Magnification | —/—/— | —/—/— | —/—/— |
| Microporous Polyethylene Membrane Temp. (° C.)/Direction/Magnification | —/—/— | —/—/— | —/—/— |
| Annealing | | | |
| Multi-Layer, Microporous Membrane Temp. (° C.)/Time (minute) | 126/10 | 126/10 | —/— |
| Microporous Polypropylene Membrane Temp. (° C.)/Time (minute) | —/— | —/— | 126/10 |
| Microporous Polyethylene Membrane Temp. (° C.)/Time (minute) | —/— | —/— | 126/10 |
| Lamination | | | |
| Temp. (° C.)/Pressure (MPa) | —/— | —/— | 120/0.05 |
| Layer Structure[(4)] | — | — | PE/PP/PE |
| Layer Thickness Ratio | — | — | 1/1/1 |
| Properties of Multi-Layer, Microporous Membrane | | | |
| Average Thickness (μm) | 24.5 | 22.1 | 26.7 |
| Air Permeability (seconds/100 cm³/20 μm) | 295 | 215 | 345 |
| Porosity (%) | 45 | 48 | 44 |
| Pin Puncture Strength (g/20 μm, mN/20 μm) | 450/4,410 | 460/4,508 | 440/4,312 |
| Tensile Strength (kg/cm², kPa) | | | |
| MD | 1,150/112,700 | 1,190/116,620 | 1,140/111,720 |
| TD | 1,020/99,960 | 1,100/107,800 | 1,010/98,980 |
| Tensile Elongation (%) | | | |
| MD/TD | 150/220 | 160/200 | 140/180 |
| Heat Shrinkage Ratio (%) | | | |
| MD/TD | 8/6 | 8/9 | 7/5 |
| Shutdown Temp. (° C.) | 135 | 135 | 135 |
| Meltdown Temp. (° C.) | 175 | 175 | 175 |
| Shutdown Speed (sec) | 10 | 15 | 15 |
| Average Thickness (μm) | 0.06 | 0.08 | 0.055 |

TABLE 2-continued

| | No. | |
|---|---|---|
| | Comp. Ex. 3 | Comp. Ex. 4 |
| Resin Composition | | |
| PP Mw$^{(1)}$/% by mass | $5.3 \times 10^5$/100 | $5.3 \times 10^5$/100 |
| PE Composition | | |
| UHMWPE Mw$^{(1)}$/% by mass | $2.0 \times 10^6$/18 | $2.0 \times 10^6$/18 |
| HDPE Mw$^{(1)}$/% by mass | $3.5 \times 10^5$/82 | $3.5 \times 10^5$/82 |
| Production Conditions | | |
| PP Concentration (% by mass) | 100 | 100 |
| PE Composition Concentration (% by mass) | 30 | 30 |
| Extrudate | | |
| Layer Structure$^{(2)}$ | PE/PP/PE | PP/PE |
| Layer Thickness Ratio | 1/1/1 | 1/1 |
| First Stretching | | |
| Laminate Sheet Temp. (° C.)/Magnification (MD × TD)$^{(3)}$ | —/— | −100/2 × 2 |
| Polypropylene Sheet Temp. (° C.)/Magnification (MD × TD)$^{(3)}$ | —/— | —/— |
| Gel-Like Polyethylene Resin Sheet Temp. (° C.)/Magnification (MD × TD)$^{(3)}$ | —/— | —/— |
| Second Stretching | | |
| Laminate Sheet Temp. (° C.)/Magnification (MD × TD)$^{(3)}$ | 115/5 × 5 | 115/2.5 × 2.5 |
| Polypropylene Sheet Temp. (° C.)/Magnification (MD × TD)$^{(3)}$ | —/— | —/— |
| Gel-Like Polyethylene Resin Sheet Temp. (° C.)/Magnification (MD × TD)$^{(3)}$ | —/— | —/— |
| Stretching of Microporous Membrane | | |
| Multi-Layer, Microporous Membrane Temp. (° C.)/Direction/Magnification | —/—/— | —/—/— |
| Microporous Polypropylene Membrane Temp. (° C.)/Direction/Magnification | —/—/— | —/—/— |
| Microporous Polyethylene Membrane Temp. (° C.)/Direction/Magnification | —/—/— | —/—/— |
| Annealing | | |
| Multi-Layer, Microporous Membrane Temp. (° C.)/Time (minute) | 125/10 | 125/10 |
| Microporous Polypropylene Membrane Temp. (° C.)/Time (minute) | —/— | —/— |
| Microporous Polyethylene Membrane Temp. (° C.)/Time (minute) | —/— | —/— |
| Lamination Temp. (° C.)/Pressure (MPa) | —/— | —/— |
| Layer Structure$^{(4)}$ | — | — |
| Layer Thickness Ratio | — | — |
| Properties of Multi-Layer, Microporous Membrane | | |
| Average Thickness (μm) | 24 | 22 |
| Air Permeability (seconds/100 cm$^3$/20 μm) | 450 | 210 |
| Porosity (%) | 39 | 47 |
| Pin Puncture Strength (g/20 μm, mN/20 μm) | 420 | 310 |
| | 4,116 | 3,038 |
| Tensile Strength (kg/cm$^2$, kPa) | | |
| MD | 1,020/99,960 | 990/97,020 |
| TD | 1,000/98,000 | 780/76,440 |
| Tensile Elongation (%) | | |
| MD/TD | 145/195 | 145/210 |
| Heat Shrinkage Ratio (%) | | |
| MD/TD | 8/8 | 9/7 |
| Shutdown Temp. (° C.) | 135 | 135 |
| Meltdown Temp. (° C.) | 175 | 175 |

TABLE 2-continued

| | | |
|---|---|---|
| Shutdown Speed (sec) | 10 | 95 |
| Average Thickness (μm) | 0.03 | 0.20 |

Note:
[(1)]Mw represents a mass-average molecular weight.
[(2)]PP represents a polypropylene melt, and PE represents a polyethylene solution.
[(3)]MD represents a longitudinal direction, and TD represents a transverse direction.
[(4)]PP represents a microporous polypropylene membrane, and PE represents a microporous polyethylene membrane.

multi-layer, microporous membranes with well-balanced permeability, mechanical strength, heat shrinkage resistance, shutdown properties and meltdown properties were obtained in Examples 5 to 7, because the cooled (three-layer) sheets were stretched at a temperature from −20° C. to +70° C., and re-stretched at a temperature from 90° C. to 135° C. On the other hand, the multi-layer, microporous membranes of Comparative Example 3 had a smaller average pore diameter in the PP layer and poorer air permeability than those of Examples 5 to 7, because the cooled three-layer, sheet was stretched only at 115° C. Accordingly, the multi-layer, microporous membranes of Comparative Example 3 would be easily short-circuited if it were used as a separator for large-capacity batteries. The multi-layer, microporous membranes of Comparative Example 4 had too larger average pore diameter in the PP layer and a slower shutdown speed than those of Examples 5 to 7, because the first stretching of the cooled two-layer sheet was conducted at a temperature lower than −20° C. Accordingly, it would be impossible to prevent troubles such as the ignition of batteries, etc. if the multi-layer, microporous membrane of Comparative Example 4 were used as a separator.

EFFECT OF THE INVENTION

According to this invention, a multi-layer, microporous polyolefin membrane comprising a polypropylene layer and a polyethylene resin layer and having well-balanced permeability, mechanical strength, heat shrinkage resistance, shutdown properties and meltdown properties can be produced. Particularly because the microporous polypropylene layer has sufficiently large pore diameters, such multi-layer, microporous membrane has excellent permeability to an electrolytic solution. The use of the multi-layer, microporous polyolefin membrane obtained by the method of this invention for a battery separator provides batteries with excellent capacity, cycle characteristics, discharge properties, heat resistance, storability and productivity. The multi-layer, microporous polyolefin membrane obtained by the method of this invention is particularly suitable for battery separators for hybrid vehicles.

What is claimed is:

1. A method for producing a multi-layer, microporous polyolefin membrane comprising a microporous polypropylene layer and a microporous polyethylene resin layer, comprising the steps of simultaneously extruding a melt blend of 20 to 55% by mass of polypropylene and 45 to 80% by mass of a membrane-forming solvent and a melt blend of 20 to 55% by mass of a polyethylene resin and 45 to 80% by mass of a membrane-forming solvent through a die to form a laminar extrudate, cooling the laminar extrudate to provide a gel-like laminate sheet, first stretching the gel-like laminate sheet biaxially at a temperature of −20° C. or higher and lower than +90° C., conducting re-stretching biaxially at a temperature of 90 to 135° C., and removing the membrane-forming solvent from the stretched gel-like laminate sheet, wherein said polyethylene resin is a composition of ultra-high molecular weight polyethylene having molecular weight of $5\times10^5$ or higher and another polyethylene having molecular weight of $1\times10^4$ or more and less than $5\times10^5$, and wherein the content of said ultra-high molecular weight polyethylene is 10 to 80% by mass based on 100% by mass of said polyethylene composition.

2. The method for producing a multi-layer, microporous polyolefin membrane according to claim 1, wherein the temperature of the first stretching is 60° C. or higher and lower than +90° C.

* * * * *